United States Patent
Umemoto

(10) Patent No.: US 9,260,557 B2
(45) Date of Patent: Feb. 16, 2016

(54) BLOCK COPOLYMER, DISPERSING AGENT, AND PIGMENT DISPERSION COMPOSITION

(71) Applicant: OTSUKA CHEMICAL CO., LTD., Osaka (JP)

(72) Inventor: Hikaru Umemoto, Tokushima (JP)

(73) Assignee: OTSUKA CHEMICAL CO., LTD., Osaka-shi (JP)

( * ) Notice: Subject to any disclaimer, the term of this patent is extended or adjusted under 35 U.S.C. 154(b) by 98 days.

(21) Appl. No.: 14/359,838

(22) PCT Filed: Nov. 30, 2012

(86) PCT No.: PCT/JP2012/081065
§ 371 (c)(1),
(2) Date: May 21, 2014

(87) PCT Pub. No.: WO2013/084815
PCT Pub. Date: Jun. 13, 2013

(65) Prior Publication Data
US 2015/0152212 A1    Jun. 4, 2015

(30) Foreign Application Priority Data

Dec. 6, 2011  (JP) ................................. 2011-267059

(51) Int. Cl.
| | |
|---|---|
| G02B 5/23 | (2006.01) |
| C08F 293/00 | (2006.01) |
| C09D 17/00 | (2006.01) |
| C08K 5/00 | (2006.01) |
| C08L 53/00 | (2006.01) |
| G02B 5/22 | (2006.01) |
| C09D 7/02 | (2006.01) |
| G02B 1/04 | (2006.01) |
| C08F 295/00 | (2006.01) |
| C08F 297/00 | (2006.01) |
| G02F 1/1335 | (2006.01) |

(52) U.S. Cl.
CPC .............. *C08F 293/005* (2013.01); *C08K 5/00* (2013.01); *C08L 53/00* (2013.01); *C09D 7/02* (2013.01); *C09D 17/00* (2013.01); *G02B 1/04* (2013.01); *G02B 5/223* (2013.01)

(58) Field of Classification Search
USPC ....... 252/582, 586; 349/106; 359/891; 430/7; 525/294

See application file for complete search history.

(56) References Cited

FOREIGN PATENT DOCUMENTS

| | | |
|---|---|---|
| EP | 1 342 758 A2 | 9/2003 |
| JP | 04-018964 A | 1/1992 |
| JP | 08-291469 A | 11/1996 |
| JP | 2008-266400 A | 11/2008 |
| JP | 2009-052010 A | 3/2009 |
| JP | 2009-084314 A | 4/2009 |
| JP | 2010-163480 A | 7/2010 |
| JP | 2011-232735 A | 11/2011 |
| JP | 2012-068559 A | 4/2012 |
| JP | 2012-212054 A | 11/2012 |

OTHER PUBLICATIONS

Notification of Transmittal of Copies of Translation of the International Preliminary Report on Patentability (Form PCT/IB/338) of International Application No. PCT/JP2012/081065 mailing date of Jun. 19, 2014, with Forms PCT/IB/373 and PCT/ISA/237.
International Search Report, dated Mar. 5, 2013, issued in corresponding application No. PCT/JP2012/081065.
Extended European Search Report dated Jul. 14, 2015, issued in counterpart European Patent Application No. 12856320.2 (6 pages).
Motala-Timol et al., "Synthesis of graft and block copolymers from 2-dimethylaminoethyl methacrylate and caprolactone", Polymer International, Feb. 21, 2007, pp. 1053-1062, vol. 56; cited in Extended European Search Report dated Jul. 14, 2015.

*Primary Examiner* — Bijan Ahvazi
(74) *Attorney, Agent, or Firm* — Westerman, Hattori, Daniels & Adrian, LLP

(57) ABSTRACT

There is provided a block copolymer that can provide excellent dispersibility, alkali developability, and dry re-solubility when used, for example, as a dispersing agent. The block copolymer has a segment A and a segment B. The amine value of the block copolymer is 20 mg KOH/g to 150 mg KOH/g.

9 Claims, No Drawings

BLOCK COPOLYMER, DISPERSING AGENT, AND PIGMENT DISPERSION COMPOSITION

TECHNICAL FIELD

The present invention relates to a block copolymer, a dispersing agent, and a pigment dispersion composition.

BACKGROUND ART

Conventionally, as methods for producing color filters used in liquid crystal displays and the like, pigment dispersion methods, dyeing methods, electrodeposition methods, printing methods, and the like have been known. Among these, pigment dispersion methods are widely used in terms of spectral characteristics, durability, pattern shape, and accuracy. In a pigment dispersion method, for example, a coating film comprising a pigment dispersion composition obtained by mixing a pigment, a dispersing agent, and a solvent is formed on a substrate, exposed via a photomask having the desired pattern shape, and alkali-developed (for example, see Patent Literature 1).

CITATION LIST

Patent Literature

Patent Literature 1: Japanese Patent Laid-Open No. 2009-52010

SUMMARY OF INVENTION

Technical Problem

When the alkali developability of a coating film formed from a pigment dispersion composition is poor, a development residue remains, and the chromaticity, contrast, dimensional accuracy, and the like of a color filter decrease in some cases.

In addition, in the step of coating with the pigment dispersion composition, or the like, a pigment dispersion composition adheres to a coating apparatus or the like and dries to form a precipitate in some cases. When the solubility of this precipitate in a solvent is low, the precipitate is mixed into a coating film and hinders image formation in some cases.

It is a main object of the present invention to provide a block copolymer that can provide excellent dispersibility, the solubility of a coating film formed from a dispersion composition in an aqueous alkali solution (hereinafter referred to as "alkali developability"), and the solubility of a dry precipitate formed from a dispersion composition in a solvent (hereinafter referred to as "dry re-solubility") when used, for example, as a dispersing agent.

Solution to Problem

The present inventors have studied diligently over and over in order to solve the above problems, and as a result, completed the present invention. Specifically, the gist of the present invention is as follows.

Item 1

A block copolymer comprising a segment A comprising a partial structure represented by the following general formula (1):

[Formula 1]

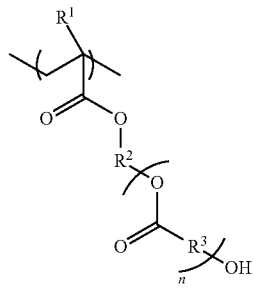

wherein n is an integer of 1 to 10; $R^1$ is a hydrogen atom or a methyl group; $R^2$ is an alkylene group having 1 to 10 carbon atoms; and $R^3$ is an alkylene group having 1 to 10 carbon atoms, and a segment B comprising a partial structure represented by the following general formula (2):

[Formula 2]

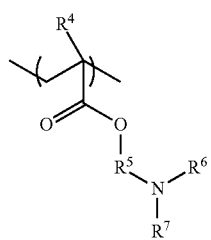

wherein $R^4$ is a hydrogen atom or a methyl group; $R^5$ is an alkylene group having 1 to 10 carbon atoms; and $R^6$ and $R^7$ are each independently a hydrogen atom or an alkyl group having 1 to 10 carbon atoms, and having an amine value of 20 mg KOH/g to 150 mg KOH/g.

Item 2 The block copolymer according to item 1, wherein the segment A comprises 10% by mass to 100% by mass of the partial structure represented by general formula (1).

Item 3 The block copolymer according to item 1 or 2, wherein the segment B comprises 80% by mass to 100% by mass of the partial structure represented by general formula (2).

Item 4 The block copolymer according to any one of items 1 to 3, wherein a mass ratio of the segment A to the segment B (a mass of the segment A: a mass of the segment B) in the block copolymer is 50:50 to 95:5.

Item 5 The block copolymer according to any one of items 1 to 4, wherein a molecular weight distribution (PDI) of the block copolymer is 1.05 to 2.20.

Item 6 The block copolymer according to any one of items 1 to 5 being a diblock copolymer comprising a block of the segment A and a block of the segment B.

Item 7 A dispersing agent comprising the block copolymer according to any one of items 1 to 6.

Item 8 A pigment dispersion composition comprising the dispersing agent according to item 7 and a pigment.

Item 9 The pigment dispersion composition according to item 8 intended for a color filter.

Advantageous Effects of Invention

According to the present invention, when used, for example, as a dispersing agent, a pigment dispersion composition that has excellent dispersibility, alkali developability, and dry re-solubility can be provided.

DESCRIPTION OF EMBODIMENTS

One example of a preferred mode of carrying out the present invention will be described below. However, the following embodiment is merely illustrative. The present invention is not limited to the following embodiment in any way.

<Block Copolymer>

(Segment A)

A block copolymer according to this embodiment has a segment A comprising a partial structure (monomer unit) represented by the following general formula (1).

[Formula 3]

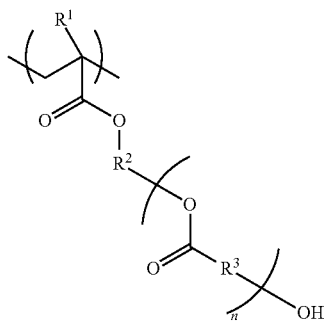

(1)

wherein n is an integer of 1 to 10; $R^1$ is a hydrogen atom or a methyl group; $R^2$ is an alkylene group having 1 to 10 carbon atoms; and $R^3$ is an alkylene group having 1 to 10 carbon atoms.

In general formula (1), n is preferably an integer of 1 to 7, more preferably an integer of 1 to 5.

Specific examples of the alkylene group having 1 to 10 carbon atoms represented by $R^2$ include a methylene group, an ethylene group, a trimethylene group, a tetramethylene group, a pentamethylene group, a hexamethylene group, and a heptamethylene group. $R^2$ is preferably an alkylene group having 1 to 5 carbon atoms.

Specific examples of the alkylene group having 1 to 10 carbon atoms represented by $R^3$ include a methylene group, an ethylene group, a trimethylene group, a tetramethylene group, a pentamethylene group, a hexamethylene group, and a heptamethylene group. $R^3$ is preferably an alkylene group having 1 to 8 carbon atoms, more preferably an alkylene group having 2 to 8 carbon atoms, and particularly preferably an alkylene group having 3 to 8 carbon atoms.

The partial structure represented by general formula (1) contained in the segment A may be composed of one type of monomer unit or a plurality of types of monomer units.

The partial structure (monomer unit) contained in the segment A may be only the partial structure represented by general formula (1), or another partial structure may be contained. When another partial structure is contained in the segment A, the another partial structure may be contained in any manner, such as random copolymerization or block copolymerization.

The segment A preferably comprises 10% by mass to 100% by mass, more preferably 20% by mass to 80% by mass, of the partial structure represented by general formula (1). The segment A preferably does not have a partial structure comprising a basic functional group, such as general formula (2) constituting a segment B described later. When the segment A has a partial structure comprising a basic functional group, the proportion of the partial structure comprising a basic functional group in the segment A is preferably 1% by mass or less.

The another partial structure that can be contained in the segment A is preferably composed of a monomer that can be copolymerized with both the monomer constituting the partial structure represented by general formula (1) and the monomer constituting the segment B described later. Specific examples of the monomer that can constitute the another partial structure in the segment A include aromatic unsaturated monomers (styrenic monomers) and (meth)acrylates. Examples of the aromatic unsaturated monomers include styrene and α-methylstyrene. Examples of the (meth)acrylates include methyl(meth)acrylate, ethyl(meth)acrylate, propyl(meth)acrylate, isopropyl(meth)acrylate, butyl(meth)acrylate, octyl(meth)acrylate, 2-ethylhexyl(meth)acrylate, glycidyl(meth)acrylate, benzyl(meth)acrylate, hydroxyethyl(meth)acrylate, polyethylene glycol(meth)acrylate, and polypropylene glycol (meth)acrylate. In the present invention, "(meth)acryl" means "at least one of acryl and methacryl," and "(meth)acrylate" means "at least one of acrylate and methacrylate". For example, "(meth)acrylic acid" means "at least one of acrylic acid and methacrylic acid."

The another partial structure that can be contained in the segment A is preferably a partial structure (monomer unit) represented by the following general formula (3).

[Formula 4]

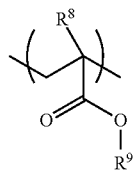

(3)

wherein $R^8$ is a hydrogen atom or a methyl group; and $R^9$ is an alkyl group having 1 to 10 carbon atoms that may have a substituent.

In $R^9$ in general formula (3), specific examples of the alkyl group having 1 to 10 carbon atoms include straight chain or branched chain alkyl groups, such as a methyl group, an ethyl group, a n-propyl group, an isopropyl group, a n-butyl group, an isobutyl group, a sec-butyl group, a tert-butyl group, a pentyl group, a hexyl group, a heptyl group, an octyl group, a nonyl group, and a decyl group. $R^9$ is preferably an alkyl group having 1 to 5 carbon atoms that may have a substituent. When the alkyl group having 1 to 10 carbon atoms represented by $R^9$ has a substituent, examples of the substituent include aryl groups. The number of carbon atoms of an aryl group is generally 6 to 12, preferably 6 to 9. Specific examples of the aryl groups include a phenyl group, a tolyl group, a xylyl group, a mesityl group, and a naphthyl group. The position of the substituent is not particularly limited. The number of substituents is generally 1 to 4, preferably 1 to 3, and more preferably 1.

(Segment B)

The block copolymer according to this embodiment has a segment B comprising a partial structure (monomer unit) represented by the following general formula (2), in addition to the above segment A.

[Formula 5]

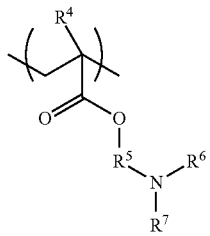

(2)

wherein $R^4$ is a hydrogen atom or a methyl group; $R^5$ is an alkylene group having 1 to 10 carbon atoms; and $R^6$ and $R^7$ are each independently a hydrogen atom or an alkyl group having 1 to 10 carbon atoms.

Specific examples of the alkylene group having 1 to 10 carbon atoms represented by $R^5$ include alkylene groups such as a methylene group, an ethylene group, a trimethylene group, a tetramethylene group, a pentamethylene group, a hexamethylene group, and a heptamethylene group. $R^5$ is preferably an alkylene group having 1 to 5 carbon atoms.

Specific examples of the alkyl groups having 1 to 10 carbon atoms represented by $R^6$ and $R^7$ include straight chain or branched chain alkyl groups, such as a methyl group, an ethyl group, a n-propyl group, an isopropyl group, a n-butyl group, an isobutyl group, a sec-butyl group, a tert-butyl group, a pentyl group, a hexyl group, a heptyl group, an octyl group, a nonyl group, and a decyl group. $R^6$ and $R^7$ are each independently preferably a hydrogen atom or an alkyl group having 1 to 5 carbon atoms.

The partial structure represented by general formula (2) contained in the segment B may be composed of one type of monomer unit or a plurality of types of monomer units.

The partial structure (monomer unit) contained in the segment B may be only the partial structure represented by general formula (2), or another partial structure may be contained. When another partial structure is contained in the segment B, the another partial structure may be contained in any manner, such as random copolymerization or block copolymerization.

The segment B preferably comprises 80% by mass to 100% by mass of the partial structure represented by general formula (2).

The another partial structure that can be contained in the segment B is preferably composed of a monomer that can be copolymerized with both the monomer constituting the partial structure represented by general formula (2) and the monomer constituting the segment A. Specific examples of the monomer that can constitute the another partial structure in the segment B include aromatic unsaturated monomers (styrenic monomers), heterocycle-containing unsaturated monomers, and (meth)acrylates. Examples of the aromatic unsaturated monomers include styrene and α-methylstyrene. Examples of the heterocycle-containing unsaturated monomers include 2-vinylpyridine and 4-vinylpyridine. Examples of the (meth)acrylates include methyl(meth)acrylate, ethyl(meth)acrylate, propyl(meth)acrylate, isopropyl(meth)acrylate, butyl(meth)acrylate, octyl(meth)acrylate, 2-ethylhexyl(meth)acrylate, glycidyl(meth)acrylate, benzyl(meth)acrylate, hydroxyethyl(meth)acrylate, polyethylene glycol(meth)acrylate, polypropylene glycol(meth)acrylate, polycaprolactone(meth)acrylate, (meth)acrylamide, (meth)acryloyloxyethyltrimethylammonium chloride, (meth)acryloyloxyethyldimethylbenzylammonium chloride, and dimethylaminopropyl(meth)acrylamide.

(Block Copolymer)

In the block copolymer, the mass ratio of the segment A to the segment B (the segment A: the segment B) is preferably 50:50 to 95:5, more preferably 60:40 to 95:5.

The amine value of the block copolymer is 20 mg KOH/g to 150 mg KOH/g. It is preferred that the partial structure represented by general formula (2) is contained in the segment B so that the amine value of the block copolymer is in this range. The lower limit value of the amine value of the block copolymer is preferably 30 mg KOH/g, and the upper limit value is preferably 120 mg KOH/g.

The lower limit value of the weight average molecular weight (Mw) of the block copolymer is preferably 8,000, more preferably 11,000. The upper limit value of the weight average molecular weight (Mw) of the block copolymer is preferably 40,000.

The block copolymer preferably has a molecular weight distribution (PDI) of 1.05 to 2.20, further preferably 1.05 to 2.00. In the present invention, the molecular weight distribution (PDI) is determined by (the weight average molecular weight (Mw) of the block copolymer)/(the number average molecular weight (Mn) of the block copolymer).

It is considered that the segment A of the block copolymer has an ester bond moiety and a terminal hydroxyl group in a side chain in the partial structure represented by general formula (1) and therefore has a high affinity for a solvent and a binder resin. On the other hand, it is considered that the segment B has a basic functional group in a side chain in the partial structure represented by general formula (2) and therefore has a high affinity for a pigment. In the block copolymer, the partial structure represented by general formula (1) contained in the segment A and the partial structure represented by general formula (2) contained in the segment B are localized. Therefore, the side chain in the partial structure represented by general formula (1) constituting the segment A can preferably interact with a solvent and a binder resin in the solvent, and independently of this, the side chain in the partial structure represented by general formula (2) constituting the segment B can preferably interact with a pigment, and therefore, the block copolymer is excellent in the dispersibility of a pigment. Therefore, the block copolymer can be preferably used as a dispersing agent for a pigment or the like.

The method for producing the block copolymer is not particularly limited. The block copolymer is obtained, for example, by sequentially subjecting monomers to a polymerization reaction by block polymerization using a living radical polymerization method or the like. It is possible to previously produce the segment A by the polymerization reaction of a monomer and polymerize the monomer of the segment B onto the segment A, or it is possible to previously produce the segment B and polymerize the monomer of the segment A onto the segment B. In addition, in the production of the block copolymer, it is possible to separately produce the segment A and the segment B by the polymerization reactions of monomers and then couple the segment A and the segment B.

The block copolymer is preferably a diblock copolymer comprising a block of the segment A and a block of the segment B and generally comprises a bond such as (the segment A)—(the segment B) or (the segment B)—(the segment A). The living radical polymerization method is a polymerization method that allows the precise control of a molecular structure while maintaining the simplicity and versatility of radical polymerization. The living radical polymerization method includes methods such as methods using transition metal catalysts (ATRP), methods using sulfur-based reversible chain transfer agents (RAFT), and methods using organotellurium compounds (TERP), depending on the difference in the method for stabilizing a polymerization growing end. Among these methods, methods using organotellurium compounds (TERP) described in International Publication No. WO 2004/14848 and International Publication No. WO 2004/14962 are preferably used in terms of the diversity of monomers that can be used, and molecular weight control in the polymer region.

<Pigment Dispersion Composition>

A pigment dispersion composition according to this embodiment comprises a dispersing agent comprising the above block copolymer, and a pigment. The pigment dispersion composition may comprise a binder resin, a solvent, and the like.

In the pigment dispersion composition, the content of the dispersing agent is preferably 5 parts by mass to 200 parts by mass, more preferably 10 parts by mass to 100 parts by mass, and further preferably 10 parts by mass to 50 parts by mass, based on 100 parts by mass of the pigment.

The pigment may be either of an organic pigment and an inorganic pigment and is particularly preferably an organic pigment comprising an organic compound as a main component. Examples of the pigment include color pigments, such as red pigments, yellow pigments, orange pigments, blue pigments, green pigments, and violet pigments. Examples of the structure of the pigment include azo pigments, such as monoazo pigments, diazo pigments, and condensed diazo pigments, and polycyclic pigments, such as diketopyrrolopyrrole pigments, phthalocyanine pigments, isoindolinone pigments, isoindoline pigments, quinacridone pigments, indigo pigments, thioindigo pigments, quinophthalone pigments, dioxazine pigments, anthraquinone pigments, perylene pigments, and perinone pigments. Only one type or a plurality of types of pigments may be contained in the pigment dispersion composition. Specific examples of the pigment include red pigments, such as C.I. Pigment Red 7, 9, 14, 41, 48:1, 48:2, 48:3, 48:4, 81:1, 81:2, 81:3, 122, 123, 146, 149, 168, 177, 178, 179, 187, 200, 202, 208, 210, 215, 224, 254, 255, and 264; yellow pigments, such as C.I. Pigment Yellow 1, 3, 5, 6, 14, 55, 60, 61, 62, 63, 65, 73, 74, 77, 81, 93, 97, 98, 104, 108, 110, 138, 139, 147, 150, 151, 154, 155, 166, 167, 168, 170, 180, 188, 193, 194, and 213; orange pigments, such as C.I. Pigment Orange 36, 38, and 43; blue pigments, such as C.I. Pigment Blue 15, 15:2, 15:3, 15:4, 15:6, 16, 22, and 60; green pigments, such as C.I. Pigment Green 7, 36, and 58; and violet pigments, such as C.I. Pigment Violet 23, 32, and 50. For the pigment, among these, C.I. Pigment Red 254, C.I. Pigment Red 255, C.I. Pigment Red 264, C.I. Pigment Blue 15, C.I. Pigment Blue 15:2, C.I. Pigment Blue 15:3, C.I. Pigment Blue 15:4, C.I. Pigment Blue 15:6, C.I. Pigment Blue 16, C.I. Pigment Green 7, C.I. Pigment Green 36, C.I. Pigment Green 58, and the like are preferred.

The content of the pigment in the pigment dispersion composition is generally 80% by mass or less, preferably 70% by mass or less, and more preferably 60% by mass or less, in the total amount of solids in the pigment dispersion composition. The content of the pigment in the pigment dispersion composition is generally 10% by mass or more, preferably 20% by mass or more, and more preferably 30% by mass or more, in the total amount of solids in the pigment dispersion composition.

The binder resin may be, for example, a polymer. When the binder resin is a polymer, specific examples of the monomer constituting the polymer include carboxyl group-containing unsaturated monomers, such as (meth)acrylic acid, maleic acid, fumaric acid, itaconic acid, citraconic acid, crotonic acid, and maleic anhydride; (meth)acrylates, such as methyl(meth)acrylate, ethyl(meth)acrylate, propyl(meth)acrylate, butyl(meth)acrylate, octyl(meth)acrylate, lauryl(meth)acrylate, 2-hydroxyethyl(meth)acrylate, benzyl(meth)acrylate, cyclohexyl(meth)acrylate, methylcyclohexyl(meth)acrylate, isobornyl(meth)acrylate, and cyclododecyl(meth)acrylate; and aromatic unsaturated monomers (styrenic monomers), such as styrene, x-methylstyrene, 4-methylstyrene (p-methylstyrene), 2-methylstyrene (o-methylstyrene), 3-methylstyrene (m-methylstyrene), 4-methoxystyrene (p-methoxystyrene), p-tert-butylstyrene, p-n-butylstyrene, and p-tert-butoxystyrene. The binder resin is preferably a copolymer of a carboxyl group-containing unsaturated monomer and a (meth)acrylate. Specific examples of such a copolymer include a copolymer of (meth)acrylic acid and butyl(meth)acrylate, a copolymer of (meth)acrylic acid and benzyl(meth)acrylate, and a copolymer of (meth)acrylic acid, butyl(meth)acrylate, and benzyl(meth)acrylate. In terms of the affinity of the binder resin for the pigment, the binder resin is particularly preferably a copolymer of (meth)acrylic acid and benzyl(meth)acrylate. In a copolymer of a carboxyl group-containing unsaturated monomer and a (meth)acrylate, the content of the carboxyl group-containing unsaturated monomer is generally 5% by mass to 90% by mass, preferably 10% by mass to 70% by mass, and more preferably 20% by mass to 70% by mass, in all monomer components.

The weight average molecular weight (Mw) of the binder resin is preferably 3,000 to 100,000, more preferably 5,000 to 50,000, and further preferably 5,000 to 20,000. When the weight average molecular weight (Mw) of the binder resin is 3,000 or more, the heat resistance, film strength, and the like of a coating film formed from the pigment dispersion composition are good. When the weight average molecular weight (Mw) is 100,000 or less, the alkali developability of this coating film is good.

The acid value of the binder resin is preferably 20 mg KOH/g to 170 mg KOH/g, more preferably 50 mg KOH/g to 150 mg KOH/g, and further preferably 90 mg KOH/g to 150 mg KOH/g. When the acid value of the binder resin is 20 mg KOH/g or more, the alkali developability when the pigment dispersion composition is formed into a coating film is good. When the acid value is 170 mg KOH/g or less, the heat resistance is good.

Only one type or a plurality of types of binder resins may be contained in the pigment dispersion composition.

In the pigment dispersion composition, the content of the resin binder is preferably 5 parts by mass to 200 parts by mass, more preferably 10 parts by mass to 100 parts by mass, and further preferably 10 parts by mass to 50 parts by mass, based on 100 parts by mass of the pigment.

The solvent is not particularly limited as long as the pigment, the dispersion, the binder resin, or the like can be dissolved, dispersed, or the like in it. The solvent may be a known one. Specific examples of the solvent include glycol monoalkyl ethers, such as ethylene glycol monomethyl ether, ethylene glycol monoethyl ether, ethylene glycol monopropyl ether, ethylene glycol monobutyl ether, propylene glycol monomethyl ether, propylene glycol monoethyl ether, propylene glycol mono-n-butyl ether, propylene glycol-t-butyl ether, diethylene glycol monomethyl ether, diethylene glycol monoethyl ether, diethylene glycol mono-n-butyl ether, methoxymethylpentanol, propylene glycol monoethyl ether, dipropylene glycol monomethyl ether, dipropylene glycol monoethyl ether, 3-methyl-3-methoxybutanol, triethylene glycol monomethyl ether, triethylene glycol monoethyl ether, and tripropylene glycol methyl ether; glycol dialkyl ethers, such as ethylene glycol dimethyl ether, ethylene glycol diethyl ether, diethylene glycol dimethyl ether, diethylene glycol diethyl ether, diethylene glycol dipropyl ether, diethylene glycol dibutyl ether, and dipropylene glycol dimethyl ether; glycol alkyl ether acetates, such as ethylene glycol monomethyl ether acetate, ethylene glycol monoethyl ether acetate, ethylene glycol mono-n-butyl ether acetate, propylene glycol monomethyl ether acetate, propylene glycol monoethyl ether acetate, propylene glycol monopropyl ether acetate, propylene glycol monobutyl ether acetate, methoxybutyl acetate, 3-methoxybutyl acetate, methoxypentyl acetate, diethylene glycol monomethyl ether acetate, diethylene glycol monoethyl ether acetate, diethylene glycol mono-n-butyl ether acetate, dipropylene glycol monomethyl ether acetate, triethylene glycol monomethyl ether acetate, triethylene glycol monoethyl ether acetate, and 3-methyl-3-methoxybutyl acetate; glycol diacetates, such as ethylene glycol diacetate, 1,3-butylene glycol diacetate, and 1,6-hexanol diacetate; alkyl acetates, such as cyclohexanol acetate; ethers, such as amyl ether, propyl ether, diethyl ether, dipropyl ether, diisopropyl ether, butyl ether, diamyl ether, ethyl isobutyl ether, and dihexyl ether; ketones, such as acetone, methyl ethyl ketone, methyl amyl ketone, methyl isopropyl ketone, methyl isoamyl ketone, diisopropyl ketone, diisobutyl ketone, methyl isobutyl ketone, cyclohexanone, ethyl amyl ketone, methyl butyl ketone, methyl hexyl ketone, methyl nonyl ketone, and methoxymethylpentanone; monohydric or polyhydric alcohols, such as ethanol, propanol, butanol, hexanol, cyclohexanol, ethylene glycol, propylene glycol, butanediol, diethylene glycol, dipropylene glycol, triethylene glycol, methoxypropanol, methoxymethylpentanol, glycerin, and benzyl alcohol; aliphatic hydrocarbons, such as n-pentane, n-octane, diisobutylene, n-hexane, hexene, isoprene, dipentene, and dodecane; alicyclic hydrocarbons, such as cyclohexane, methylcyclohexane, methylcyclohexene, and bicyclohexyl; aromatic hydrocarbons, such as benzene, toluene, xylene, and cumene; chain or cyclic esters, such as amyl formate, ethyl formate, ethyl acetate, butyl acetate, propyl acetate, amyl acetate, methyl isobutyrate, ethylene glycol acetate, ethyl propionate, propyl propionate, butyl butyrate, isobutyl butyrate, methyl isobutyrate, ethyl caprylate, butyl stearate, ethyl benzoate, methyl 3-ethoxypropionate, ethyl 3-ethoxypropionate, methyl 3-methoxypropionate, ethyl 3-methoxypropionate, propyl 3-methoxypropionate, butyl 3-methoxypropionate, and γ-butyrolactone; alkoxycarboxylic acids, such as 3-methoxypropionic acid and 3-ethoxypropionic acid; halogenated hydrocarbons, such as butyl chloride and amyl chloride; ether ketones, such as methoxymethylpentanone; and nitriles, such as acetonitrile and benzonitrile. The solvent is preferably a glycol alkyl ether acetate or a monohydric or polyhydric alcohol in terms of the dispersibility of the pigment and the like, the solubility of the dispersing agent, the coating properties of the pigment dispersion composition, and the like. Only one type or a plurality of types of solvents may be contained in the pigment dispersion composition.

The content of the solvent in the pigment dispersion composition is not particularly limited and can be appropriately adjusted. The upper limit value of the content of the solvent in the pigment dispersion composition is generally 99% by mass. In addition, the lower limit value of the content of the solvent in the pigment dispersion composition is generally 70% by mass, preferably 80% by mass, considering viscosity suitable for coating with the pigment dispersion composition.

The above solvent can be used as a solvent for dissolving and removing a precipitate formed from the pigment dispersion composition.

The pigment dispersion composition is obtained by mixing the pigment, the dispersing agent, the binder resin, the solvent, and the like using a mixing and dispersing machine, for example, a paint shaker, a bead mill, a ball mill, a dissolver, or a kneader. The pigment dispersion composition is preferably filtered after the mixing.

The pigment dispersion composition may comprise other additives as required. Examples of the other additives include a polyfunctional monomer, a photopolymerization initiator, a pigment derivative, a pH adjusting agent, an antioxidant, an ultraviolet absorbing agent, a preservative, and a fungicide.

As the polyfunctional monomer, compounds having at least two ethylenic unsaturated double bonds compatible with the binder resin, and the like are preferred. As such compounds, compounds having alkali solubility and having one or more acidic functional groups and two or more ethylenic unsaturated bonds in one molecule are preferred, and compounds having one or more acidic functional groups and three or more ethylenic unsaturated bonds in one molecule are further preferred. Examples of the compounds having at least two ethylenic unsaturated double bonds include polyfunctional (meth)acrylates, such as bifunctional (meth)acrylates and tri- or higher functional (meth)acrylates. Among these, tri- or higher functional (meth)acrylates are preferred. As the compounds having one or more acidic functional groups and two or more ethylenic unsaturated bonds in one molecule, acidic functional group-containing polyfunctional (meth)acrylates are more preferred, and tri- or higher functional, acidic functional group-containing polyfunctional (meth)acrylates are particularly preferred. The acidic functional group should be one capable of alkali development. Examples of the acidic functional group include a carboxy group, a sulfonic acid group, and a phosphoric acid group. For the acidic functional group, a carboxy group is preferred in terms of alkali developability and the handling properties of the resin composition.

Examples of the pigment derivative include those obtained by substituting the skeleton structure of the above pigment with a sulfonic acid group, a phthalimidomethyl group, a dialkylaminoalkyl group, a hydroxyl group, a carboxyl group, or the like directly or via an alkyl group, an aryl group, a heterocyclic group, or the like. By using the above pigment and the pigment derivative in combination, the dispersibility, dispersion stability, and the like of the pigment can be improved.

The viscosity of the pigment dispersion composition is preferably 20 mPa·s or less at 25° C. When the viscosity of the pigment dispersion composition is 20 mPa·s or less, the efficiency of forming a coating film of the pigment dispersion composition is good, and variations in the thickness of the coating film are suppressed. The viscosity of the pigment dispersion composition can be measured using an E-type viscometer.

By coating a substrate with the pigment dispersion composition by a method such as a spin coating method, a roll coating method, or a slit coating method, a coating film of the pigment dispersion composition can be formed on the substrate. After the substrate is coated with the pigment dispersion composition, drying (solvent removal treatment) and the like may be performed as required.

As described above, the block copolymer has the segment A and the segment B, and the amine value of the block copolymer is 20 mg KOH/g to 150 mg KOH/g. The pigment dispersion composition comprising such a block copolymer is excellent in alkali developability and dry re-solubility.

When the pigment dispersion composition is used, for example, as a patterning material for a color filter, a development residue can be inhibited from remaining to decrease the chromaticity, contrast, and dimensional accuracy of the color filter because the pigment dispersion composition is excellent in alkali developability.

In addition, the pigment dispersion composition is excellent in dry re-solubility, and therefore, when the pigment dispersion composition adheres to a coating apparatus or the like and dries, and a precipitate forms, this precipitate dissolves rapidly in a solvent, and the precipitate can be simply washed using a solvent or the like. In addition, even if this precipitate is mixed into the pigment dispersion composition, the precipitate dissolves in the pigment dispersion composition. Therefore, the precipitate can be inhibited from hindering image formation.

The details of the reasons why the pigment dispersion composition according to this embodiment is excellent in alkali developability and dry re-solubility are not certain, but they can be considered, for example, as follows. The pigment dispersion composition according to this embodiment comprises a dispersing agent comprising the above block copolymer. The basic functional group in the localized partial structure represented by general formula (2) in the block copolymer is strongly adsorbed on the surface of the pigment, and therefore, the cohesion of the pigment is weak also after the drying of the pigment dispersion composition according to this embodiment. In addition, the block copolymer has an ester bond moiety and a terminal hydroxyl group in a side chain in the localized partial structure represented by general formula (1) and thus interacts with the solvent and the binder resin. In addition, the block copolymer has an ester bond moiety and a terminal hydroxyl group in a side chain in the localized partial structure represented by general formula (1), and thus, the glass transition temperature of the segment A is relatively low. Therefore, it is considered that the pigment dispersion composition according to this embodiment dissolves rapidly in a solvent or an aqueous alkali solution also after drying. It is considered that for the reasons as described above, the pigment dispersion composition is excellent in alkali developability and dry re-solubility.

The pigment dispersion composition can be preferably used for a color filter.

EXAMPLES

The present invention will be described below in more detail based on specific Examples. The present invention is not limited to the following Examples in any way and can be carried out by making appropriate changes without departing from the spirit thereof. The polymerization rate, weight average molecular weight (Mw), molecular weight distribution (PDI), amine value, and acid value of a dispersing agent and a binder resin, and the viscosity, dry re-solubility, and alkali developability of a pigment dispersion composition were evaluated according to the following methods.

<Polymerization Rate>

$^1$H-NMR was measured using an NMR (trade name: AVANCE 500, manufactured by Bruker BioSpin K.K.), and the polymerization rate was calculated from the peak area ratio of the vinyl group of a monomer to the ester side chain of a polymer.

<Weight Average Molecular Weight (Mw) and Molecular Weight Distribution (PDI)>

A calibration curve was prepared using a GPC (trade name: GPCV-2000, manufactured by Nihon Waters K.K., column: TSKgel α-3000, mobile phase: a 10 mM triethylamine/dimethylformamide solution) and using polystyrene (molecular weight 427,000, 190,000, 96,400, 37,400, 10,200, 2,630, 440, and 92) as a standard substance, and the weight average molecular weight (Mw) and the number average molecular weight (Mn) were measured. The molecular weight distribution (PDI=Mw/Mn) was calculated from these measured values.

<Amine Value>

The amine value is represented by the weight of potassium hydroxide (KOH) equivalent to a basic component per g of solids. A measurement sample was dissolved in tetrahydrofuran, and the obtained solution was subjected to neutralization titration with a 0.1 M hydrochloric acid/2-propanol solution using a potentiometric titration apparatus (trade name: GT-06, manufactured by Mitsubishi Chemical Corporation). The inflection point of the titration pH curve was taken as the titration end point, and the amine value (B) was calculated by the following formula.

$$B = 56.11 \times Vs \times 0.1 \times f/w$$

B: the amine value (mg KOH/g)

Vs: the amount of the 0.1 M hydrochloric acid/2-propanol solution used (mL) required for the titration f: the titer of the 0.1 M hydrochloric acid (2-propanolic)

w: the weight of the measurement sample (g) (in terms of solids)

<Acid Value>

The acid value represents the weight of potassium hydroxide required to neutralize an acidic component per g of solids. A measurement sample was dissolved in tetrahydrofuran, and the obtained solution was subjected to neutralization titration with a 0.5 M potassium hydroxide/ethanol solution using a potentiometric titration apparatus (trade name: GT-06, manufactured by Mitsubishi Chemical Corporation). The inflection point of the titration pH curve was taken as the titration end point, and the acid value was calculated by the following formula.

$$A = 56.11 \times Vs \times 0.5 \times f/w$$

A: the acid value (mg KOH/g)

Vs: the amount of the 0.5 M potassium hydroxide/ethanol solution used (mL) required for the titration f: the titer of the 0.5 M potassium hydroxide/ethanol solution w: the weight of the measurement sample (g) (in terms of solids)

<Viscosity>

The viscosity was measured at 25° C. at a number of revolutions of a rotor of 60 rpm using an E-type viscometer (trade name: TVE-22L, manufactured by TOKI SANGYO CO., LTD.) and using a 1°34'×R24 cone rotor.

<Dry Re-solubility>

A 50 mm×30 mm glass plate whose surface was washed was coated with a pigment dispersion composition with a thickness of 25 μm and dried at 90° C. for 10 minutes to form a coating film. Next, the glass plate was immersed in a solvent (propylene glycol monomethyl ether acetate), and the solubility of the coating film in the solvent was observed. The solubility was evaluated according to the following criteria.

⊚: The coating film is eluted from the glass plate within 5 minutes of immersion.

○: The coating film is eluted from the glass plate within 10 minutes of immersion.

×: The coating film remains on the glass plate after 10 minutes of immersion.

<Alkali Developability>

A coating film of a pigment dispersion composition was formed with a thickness of 25 μm on a 50 mm×30 mm glass plate whose surface was washed, and dried at 90° C. for 10 minutes. Next, the glass plate on which the coating film was formed was immersed in a 1% aqueous potassium hydroxide solution, and the solubility of the coating film in the 1% aqueous potassium hydroxide solution (aqueous alkali solution) was observed. The solubility was evaluated according to the following criteria.

⊙: The coating film is eluted from the glass plate within 5 minutes of immersion.

○: The coating film is eluted from the glass plate within 10 minutes of immersion.

×: The coating film remains on the glass plate after 10 minutes of immersion.

<Synthesis of Polymerization Initiator>

Synthesis Example 1

Synthesis of
Ethyl-2-methyl-2-n-butyltellanyl-propionate
(Hereinafter referred to as "BTEE")

6.38 g (50 mmol) of metal tellurium (trade name: Tellurium (−40 mesh), manufactured by Aldrich) was suspended in 50 mL of tetrahydrofuran. 34.4 mL (55 mmol) of n-butyl-lithium (manufactured by Aldrich, a 1.6 M hexane solution) was slowly dropped into the obtained suspension at room temperature (for 10 minutes). The obtained reaction solution was stirred until the metal tellurium completely disappeared (for 20 minutes). 10.7 g (55 mmol) of ethyl-2-bromo-isobutyrate was added to this reaction solution at room temperature, and the mixture was stirred for 2 hours. After the completion of the reaction, the solvent was concentrated under reduced pressure followed by reduced-pressure distillation to obtain BTEE, 8.98 g (yield 59.5%) of a yellow oil.

Synthesis Example 2

Dibutyl Ditelluride (Hereinafter Referred to as "DBDT") Synthesis 3.19 g (25 mmol) of metal tellurium (trade name: Tellurium (-40 mesh), manufactured by Aldrich) was suspended in 25 mL of tetrahydrofuran, and 17.2 mL (27.5 mmol) of n-butyllithium (manufactured by Aldrich, a 1.6 M hexane solution) was slowly added at 0° C. (for 10 minutes). The obtained reaction solution was stirred until the metal tellurium completely disappeared (for 10 minutes). Next, 20 mL of an ammonium chloride solution was added at room temperature, and the mixture was stirred for 1 hour. Next, the organic layer was separated, and the aqueous layer was extracted three times with diethyl ether. The collected organic layer was dried with anhydrous sodium sulfate and then concentrated under reduced pressure to obtain DBDT, 4.41 g (11.93 mmol: yield 95%) of a black-violet oil.

<Synthesis of Dispersing Agent>

Synthesis Example 3

Synthesis of Dispersing Agent A

A flask equipped with an argon gas introduction tube and a stirrer was charged with 3.00 g of a 5 mol caprolactone adduct of 2-hydroxyethyl methacrylate (trade name: Placcel FM5, manufactured by Daicel Corporation, hereinafter referred to as "PCL5"), 9.00 g of n-butyl methacrylate (trade name: n-Butyl methacrylate, manufactured by MITSUBISHI RAYON CO., LTD., hereinafter referred to as "BMA"), 0.0493 g of azobisisobutyronitrile (trade name: AIBN, manufactured by Otsuka Chemical Co., Ltd., hereinafter referred to as "AIBN"), and 6.71 g of propylene glycol monomethyl ether acetate (hereinafter referred to as "PMA"). After argon replacement, BTEE (0.449 g) and DBDT (0.277 g) were added, and the mixture was reacted at 60° C. for 22 hours. The polymerization rate was 100%.

A mixed solution of 3.00 g of dimethylaminoethyl methacrylate (trade name: GE720 (DAM), manufactured by MITSUBISHI GAS CHEMICAL COMPANY, INC., hereinafter referred to as "DMAEMA"), AIBN (0.0245 g), and PMA (2.00 g) previously subjected to argon replacement was added to the obtained solution, and the mixture was reacted at 60 ° C. for 29 hours. The polymerization rate was 100%.

After the completion of the reaction, PMA (37.3 g) was added to the reaction solution, and the mixture was poured into stirred n-heptane (384 mL). The precipitated polymer was suction-filtered and dried to obtain a dispersing agent A. The weight average molecular weight (Mw) was 11,500, the molecular weight distribution (PDI) was 1.52, and the amine value was 68 mg KOH/g. The results are shown in Table 1.

Synthesis Example 4

Synthesis of Dispersing Agent B

A flask equipped with an argon gas introduction tube and a stirrer was charged with PCL5 (116.0 g), BMA (84.5 g), AIBN (0.821 g), and PMA (133.0 g). After argon replacement, BTEE (7.49 g) and DBDT (4.63 g) were added, and the mixture was reacted at 60° C. for 12 hours. The polymerization rate was 98%.

A mixed solution of DMAEMA (50.0 g), AIBN (0.411 g), and PMA (33.3 g) previously subjected to argon replacement was added to the obtained solution, and the mixture was reacted at 60° C. for 10 hours. The polymerization rate was 95%.

After the completion of the reaction, PMA (583.0 g) was added to the reaction solution, and the mixture was poured into stirred n-heptane (6.0 L). The precipitated polymer was suction-filtered and dried to obtain a dispersing agent B. The weight average molecular weight (Mw) was 16,000, the molecular weight distribution (PDI) was 2.00, and the amine value was 68 mg KOH/g. The results are shown in Table 1.

Synthesis Example 5

Synthesis of Dispersing Agent C

A flask equipped with an argon gas introduction tube and a stirrer was charged with PCL5 (9.03 g), BMA (3.00 g), AIBN (0.0493 g), and PMA (4.14 g). After argon replacement, BTEE (0.449 g) and DBDT (0.277 g) were added, and the mixture was reacted at 60° C. for 22 hours. The polymerization rate was 100%.

A mixed solution of DMAEMA (3.00 g), AIBN (0.0245 g), and PMA (2.00 g) previously subjected to argon replacement was added to the obtained solution, and the mixture was reacted at 60° C. for 29 hours. The polymerization rate was 100%.

After the completion of the reaction, PMA (37.3 g) was added to the reaction solution, and the mixture was poured into stirred n-heptane (384 mL). The precipitated polymer was suction-filtered and dried to obtain a dispersing agent C. The weight average molecular weight (Mw) was 15,900, the molecular weight distribution (PDI) was 1.88, and the amine value was 65 mg KOH/g. The results are shown in Table 1.

Synthesis Example 6

Synthesis of Dispersing Agent D

A flask equipped with an argon gas introduction tube and a stirrer was charged with PCL5 (177.5 g), AIBN (0.821 g), and PMA (118.3 g). After argon replacement, BTEE (7.49 g) and DBDT (4.63 g) were added, and the mixture was reacted at 60° C. for 12 hours. The polymerization rate was 99%.

A mixed solution of DMAEMA (72.5 g), AIBN (0.411 g), and PMA (44.4 g) previously subjected to argon replacement was added to the obtained solution, and the mixture was reacted at 60° C. for 10 hours. The polymerization rate was 96%.

After the completion of the reaction, PMA (583.0 g) was added to the reaction solution, and the mixture was poured into stirred n-heptane (6.0 L). The precipitated polymer was suction-filtered and dried to obtain a dispersing agent D. The weight average molecular weight (Mw) was 19,100, the molecular weight distribution (PDI) was 2.37, and the amine value was 99 mg KOH/g. The results are shown in Table 1.

Synthesis Example 7

Synthesis of Dispersing Agent E

A flask equipped with an argon gas introduction tube and a stirrer was charged with PCL5 (359.8 g), BMA (260.0 g), AIBN (3.16 g), and PMA (300.0 g). After argon replacement, BTEE (31.0 g) and DBDT (17.8 g) were added, and the mixture was reacted at 60° C. for 19 hours. The polymerization rate was 100%.

A mixed solution of DMAEMA (347.0 g), AIBN (1.58 g), and PMA (179.0 g) previously subjected to argon replacement was added to the obtained solution, and the mixture was reacted at 60° C. for 23 hours. The polymerization rate was 99%.

After the completion of the reaction, PMA (2260.0 g) was added to the reaction solution, and the mixture was poured into stirred n-heptane (23.2 L). The precipitated polymer was suction-filtered and dried to obtain a dispersing agent E. The weight average molecular weight (Mw) was 11,200, the molecular weight distribution (PDI) was 1.64, and the amine value was 123 mg KOH/g. The results are shown in Table 1.

Synthesis Example 8

Synthesis of Dispersing Agent F

A flask equipped with an argon gas introduction tube and a stirrer was charged with PCL5 (103.0 g), BMA (75.0 g), AIBN (0.821 g), and PMA (88.9 g). After argon replacement, BTEE (7.49 g) and DBDT (4.63 g) were added, and the mixture was reacted at 60° C. for 25 hours. The polymerization rate was 100%.

A mixed solution of DMAEMA (72.5 g), AIBN (0.411 g), and PMA (44.4 g) previously subjected to argon replacement was added to the obtained solution, and the mixture was reacted at 60° C. for 24 hours. The polymerization rate was 97%.

After the completion of the reaction, PMA (583.0 g) was added to the reaction solution, and the mixture was poured into stirred n-heptane (6.0 L). The precipitated polymer was suction-filtered and dried to obtain a dispersing agent F. The weight average molecular weight (Mw) was 13,400, the molecular weight distribution (PDI) was 1.67, and the amine value was 100 mg KOH/g. The results are shown in Table 1.

Synthesis Example 9

Synthesis of Dispersing Agent G

A flask equipped with an argon gas introduction tube and a stirrer was charged with PCL5 (124.0 g), BMA (90.8 g), AIBN (0.821 g), and PMA (143.0 g). After argon replacement, BTEE (7.49 g) and DBDT (4.63 g) were added, and the mixture was reacted at 60° C. for 12 hours. The polymerization rate was 98%.

A mixed solution of DMAEMA (35.0 g), AIBN (0.411 g), and PMA (23.3 g) previously subjected to argon replacement was added to the obtained solution, and the mixture was reacted at 60° C. for 9 hours. The polymerization rate was 98%.

After the completion of the reaction, PMA (583.0 g) was added to the reaction solution, and the mixture was poured into stirred n-heptane (6.0 L). The precipitated polymer was suction-filtered and dried to obtain a dispersing agent G. The weight average molecular weight (Mw) was 15,400, the molecular weight distribution (PDI) was 1.72, and the amine value was 48 mg KOH/g. The results are shown in Table 1.

Synthesis Example 10

Synthesis of Dispersing Agent H

A flask equipped with an argon gas introduction tube and a stirrer was charged with PCL5 (82.3 g), BMA (147.0 g), AIBN (0.821 g), and PMA (117.0 g). After argon replacement, BTEE (7.49 g) and DBDT (4.63 g) were added, and the mixture was reacted at 60° C. for 14 hours. The polymerization rate was 99%.

A mixed solution of DMAEMA (21.0 g), AIBN (0.411 g), and PMA (14.0 g) previously subjected to argon replacement was added to the obtained solution, and the mixture was reacted at 60° C. for 6 hours. The polymerization rate was 98%.

After the completion of the reaction, PMA (583.0 g) was added to the reaction solution, and the mixture was poured into stirred n-heptane (6.0 L). The precipitated polymer was suction-filtered and dried to obtain a dispersing agent H. The weight average molecular weight (Mw) was 23,100, the molecular weight distribution (PDI) was 2.05, and the amine value was 27 mg KOH/g. The results are shown in Table 1.

Synthesis Example 11

Synthesis of Dispersing Agent I

A flask equipped with an argon gas introduction tube and a stirrer was charged with PCL5 (634.9 g), BMA (464.0 g), AIBN (3.94 g), and PMA (461.0 g). After argon replacement, BTEE (36.0 g) and DBDT (22.2 g) were added, and the mixture was reacted at 60° C. for 14 hours. The polymerization rate was 98%.

A mixed solution of DMAEMA (101.0 g), AIBN (1.97 g), and PMA (67.2 g) previously subjected to argon replacement was added to the obtained solution, and the mixture was reacted at 60° C. for 10 hours. The polymerization rate was 100%.

After the completion of the reaction, PMA (2350.0 g) was added to the reaction solution, and the mixture was poured into stirred n-heptane (28.8 L). The precipitated polymer was suction-filtered and dried to obtain a dispersing agent I. The weight average molecular weight (Mw) was 18,800, the molecular weight distribution (PDI) was 2.05, and the amine value was 30 mg KOH/g. The results are shown in Table 1.

Synthesis Example 12

Synthesis of Dispersing Agent J

A flask equipped with an argon gas introduction tube and a stirrer was charged with PCL5 (136.3 g), BMA (99.7 g), AIBN (0.547 g), and PMA (98.9 g). After argon replacement, BTEE (5.00 g) and DBDT (3.08 g) were added, and the mixture was reacted at 60° C. for 24 hours. The polymerization rate was 100%.

A mixed solution of DMAEMA (14.0 g), AIBN (0.274 g), and PMA (9.33 g) previously subjected to argon replacement was added to the obtained solution, and the mixture was reacted at 60° C. for 22 hours. The polymerization rate was 98%.

After the completion of the reaction, PMA (583.0 g) was added to the reaction solution, and the mixture was poured into stirred n-heptane (6.0 L). The precipitated polymer was suction-filtered and dried to obtain a dispersing agent J. The weight average molecular weight (Mw) was 33,900, the molecular weight distribution (PDI) was 2.50, and the amine value was 20 mg KOH/g. The results are shown in Table 1.

Synthesis Example 13

Synthesis of Dispersing Agent K

A flask equipped with an argon gas introduction tube and a stirrer was charged with 6.93 g of a 2 mol caprolactone adduct of 2-hydroxyethyl methacrylate (trade name: Placcel FM2D, manufactured by Daicel Corporation), BMA (5.07 g), AIBN (0.0493 g), and PMA (8.00 g). After argon replacement, BTEE (0.449 g) and DBDT (0.277 g) were added, and the mixture was reacted at 60° C. for 22 hours. The polymerization rate was 100%.

A mixed solution of DMAEMA (3.00 g), AIBN (0.0245 g), and PMA (2.00 g) previously subjected to argon replacement was added to the obtained solution, and the mixture was reacted at 60° C. for 29 hours. The polymerization rate was 100%.

After the completion of the reaction, PMA (37.3 g) was added to the reaction solution, and the solution was poured into stirred n-heptane (384 mL). The precipitated polymer was suction-filtered and dried to obtain a dispersing agent K. The weight average molecular weight (Mw) was 23,000, the molecular weight distribution (PDI) was 2.57, and the amine value was 69 mg KOH/g. The results are shown in Table 1.

Synthesis Example 14

Synthesis of Dispersing Agent L

A flask equipped with an argon gas introduction tube and a stirrer was charged with BMA (200.0 g), AIBN (0.821 g), and PMA (147.8 g). After argon replacement, BTEE (3.75 g) and DBDT (2.30 g) were added, and the mixture was reacted at 60° C. for 20 hours. The polymerization rate was 99%.

A mixed solution of DMAEMA (50.0 g), AIBN (0.411 g), and PMA (33.3 g) previously subjected to argon replacement was added to the obtained solution, and the mixture was reacted at 60° C. for 17 hours. The polymerization rate was 99%.

After the completion of the reaction, PMA (583.0 g) was added to the reaction solution, and the mixture was poured into stirred n-heptane (6.0 L). The precipitated polymer was suction-filtered and dried to obtain a dispersing agent L. The weight average molecular weight (Mw) was 19,100, the molecular weight distribution (PDI) was 1.47, and the amine value was 81 mg KOH/g. The results are shown in Table 1.

Synthesis Example 15

Synthesis of Dispersing Agent M

A flask equipped with an argon gas introduction tube and a stirrer was charged with DMAEMA (300 g), AIBN (2.46 g), and ethyl acetate (300 g). After argon replacement, BTEE (45.0 g) and DBDT (27.7 g) were added, and the mixture was reacted at 60° C. for 25 hours. The polymerization rate was 99%.

A mixed solution of BMA (1200 g), AIBN (2.46 g), and ethyl acetate (700 g) previously subjected to argon replacement was added to the obtained solution, and the mixture was reacted at 60° C. for 40 hours. The polymerization rate was 98%.

After the completion of the reaction, PMA (3500.0 g) was added to the reaction solution, and the mixture was poured into stirred n-heptane (36.0 L). The precipitated polymer was suction-filtered and dried to obtain a dispersing agent M. The weight average molecular weight (Mw) was 9,400, the molecular weight distribution (PDI) was 1.35, and the amine value was 72 mg KOH/g. The results are shown in Table 1.

Synthesis Example 16

Synthesis of Dispersing Agent N

A flask equipped with an argon gas introduction tube and a stirrer was charged with PCL5 (6.93 g), BMA (5.07 g), DMAEMA (3.00 g), AIBN (0.0493 g), and PMA (7.03 g). After argon replacement, BTEE (0.449 g) and DBDT (0.277 g) were added, and the mixture was reacted at 60° C. for 22 hours. The polymerization rate was 100%.

After the completion of the reaction, PMA (37.3 g) was added to the reaction solution, and the solution was poured into stirred n-heptane (384 mL). The precipitated polymer was suction-filtered and dried to obtain a dispersing agent N. The weight average molecular weight (Mw) was 15,200, the molecular weight distribution (PDI) was 1.69, and the amine value was 67 mg KOH/g. The results are shown in Table 1.

Synthesis Example 17

Synthesis of Dispersing Agent O

A flask equipped with an argon gas introduction tube and a stirrer was charged with 12.7 g of triethylene glycol monoethyl ether monomethacrylate (manufactured by POLYSCIENCES), BMA (34.0 g), 70.4 g of methyl methacrylate (manufactured by MITSUBISHI RAYON CO., LTD.), 32.0 g of 2-ethylhexyl methacrylate (manufactured by MITSUBISHI RAYON CO., LTD.), 23.5 g of benzyl methacrylate (manufactured by MITSUBISHI GAS CHEMICAL COMPANY, INC., hereinafter referred to as "BzMA"), AIBN (1.17 g), and PMA (90.9 g). After argon replacement, BTEE (10.7 g) and DBDT (6.59 g) were added, and the mixture was reacted at 60° C. for 14 hours. The polymerization rate was 100%.

A mixed solution of DMAEMA (77.4 g), AIBN (0.586 g), and PMA (51.6 g) previously subjected to argon replacement was added to the obtained solution, and the mixture was reacted at 60° C. for 8 hours. The polymerization rate was 99%.

After the completion of the reaction, PMA (583.0 g) was added to the reaction solution, and the solution was poured into stirred n-heptane (6.0 L). The precipitated polymer was suction-filtered and dried to obtain a dispersing agent O. The weight average molecular weight (Mw) was 7,600, the molecular weight distribution (PDI) was 1.38, and the amine value was 108 mg KOH/g. The results are shown in Table 1.

<Synthesis of Binder Resin>

Synthesis Example 18

A flask equipped with an argon gas introduction tube and a stirrer was charged with 20.0 g of methacrylic acid (manufactured by MITSUBISHI RAYON CO., LTD., hereinafter referred to as "MAA"), BzMA (80.0 g), and PMA (290.0 g). After argon replacement, AIBN (1.5 g), n-dodecanethiol (2.0 g), and PMA (10.0 g) were added, and the temperature was increased to 90° C. While the solution was maintained at 90° C., MAA (40.0 g), BzMA (160.0 g), AIBN (3.0 g), n-dodecanethiol (4.0 g), and PMA (25.0 g) were dropped into the solution over 1.5 hours. After 60 minutes from the completion of the dropping, the temperature was increased to 110° C., AIBN (0.3 g) and PMA (5.0 g) were added, and the mixture was reacted for 1 hour. AIBN (0.3 g) and PMA (5.0 g) were further added, and the mixture was reacted for 1 hour. AIBN (0.3 g) and PMA (5.0 g) were further added, and the mixture was reacted for 1 hour.

The obtained reaction solution was cooled to room temperature, and PMA (120.0 g) was added to obtain a solution of a binder resin A having a non-volatile content of 40%. The weight average molecular weight (Mw) of the binder resin A was 9,800, the molecular weight distribution (PDI) was 1.93, and the acid value was 127 mg KOH/g.

Examples 1 to 14 and Comparative Examples 1 to 5

A blend was adjusted to be 10 parts by mass of a pigment, 3 parts by mass of a dispersing agent, 3 parts by mass of a binder resin, 10 parts by mass of methoxypropanol, and 74 parts by mass of PMA, and stirred by a planetary ball mill (0.5 mm zirconia beads, 2 hours) to obtain the pigment dispersion compositions of Examples 1 to 14 and Comparative Examples 1 to 5 shown in Table 1. As the dispersing agent, the dispersing agents A to O obtained in Synthesis Examples 3 to 17 were used. For the binder resin, the binder resin A obtained in Synthesis Example 18 was used. For the pigment, C.I. Pigment Red 254 (trade name: BKCF, manufactured by Ciba Specialty Chemicals Inc.) and C.I. Pigment Green 58 (trade name: FASTOGEN Green A110, manufactured by DIC Corporation) were used.

The viscosity of the obtained pigment dispersion compositions and the dry solubility and alkali developability of the pigment dispersion compositions were evaluated. The results are shown in Table 1.

TABLE 1

| | | Dispersing agent | | | | | | | | |
|---|---|---|---|---|---|---|---|---|---|---|
| | | Molecular structure | | | Physical properties | | | | Evaluation results | | |
| | | Segment A | | Segment B | | | | | | | |
| | Pigment | general formula (1) [% by mass] | general formula (3) [% by mass] | general formula (2) [% by mass] | Amine value [mgKOH/g] | Molecular weight distribution (PDI) | Weight average molecular weight (Mw) | Type of copolymerization | Viscosity [mPa·s] | Dry re-solubility | Alkali developability |
| Ex. 1 | C.I. PigmentRed254 | 20 | 60 | 20 | 68 | 1.52 | 11,500 | Block | 20 | ◎ | ◎ |
| Ex. 2 | C.I. PigmentRed254 | 46 | 34 | 20 | 68 | 2.00 | 16,000 | Block | 14 | ◎ | ◎ |
| Ex. 3 | C.I. PigmentRed254 | 60 | 20 | 20 | 65 | 1.88 | 15,900 | Block | 4 | ◎ | ◎ |
| Ex. 4 | C.I. PigmentRed254 | 71 | 0 | 29 | 99 | 2.37 | 19,100 | Block | 37 | ○ | ◎ |
| Ex. 5 | C.I. PigmentRed254 | 37 | 27 | 36 | 123 | 1.64 | 11,200 | Block | 33 | ○ | ◎ |
| Ex. 6 | C.I. PigmentRed254 | 41 | 30 | 29 | 100 | 1.67 | 13,400 | Block | 10 | ◎ | ◎ |
| Ex. 7 | C.I. PigmentRed254 | 50 | 36 | 14 | 48 | 1.72 | 15,400 | Block | 20 | ◎ | ◎ |
| Ex. 8 | C.I. PigmentRed254 | 33 | 59 | 8 | 30 | 2.05 | 23,100 | Block | 28 | ◎ | ◎ |
| Ex. 9 | C.I. PigmentRed254 | 53 | 39 | 8 | 30 | 2.05 | 18,800 | Block | 31 | ◎ | ◎ |
| Ex. 10 | C.I. PigmentRed254 | 55 | 40 | 6 | 20 | 2.50 | 33,900 | Block | 18 | ○ | ◎ |
| Ex. 11 | C.I. PigmentRed254 | 46 | 34 | 20 | 69 | 2.57 | 23,000 | Block | 28 | ○ | ◎ |
| Ex. 12 | C.I. PigmentGreen58 | 46 | 34 | 20 | 68 | 2.00 | 16,000 | Block | 15 | ○ | ○ |
| Ex. 13 | C.I. PigmentGreen58 | 41 | 30 | 29 | 100 | 1.67 | 13,400 | Block | 2 | ○ | ○ |
| Ex. 14 | C.I. PigmentGreen58 | 50 | 36 | 14 | 48 | 1.72 | 15,400 | Block | 2 | ○ | ○ |
| Comp. Ex. 1 | C.I. PigmentRed254 | 0 | 80 | 20 | 71 | 1.47 | 19,100 | Block | 5 | ○ | X |
| Comp. Ex. 2 | C.I. PigmentRed254 | 0 | 80 | 20 | 72 | 1.35 | 9,400 | Block | 5 | X | X |
| Comp. Ex. 3 | C.I. PigmentRed254 | 46 | 34 | 20 | 67 | 1.69 | 15,200 | Random | >40 | X | X |
| Comp. Ex. 4 | C.I. PigmentRed254 | 0 | 69 | 31 | 111 | 1.38 | 7,630 | Block | 13 | X | X |
| Comp. Ex. 5 | C.I. PigmentGreen58 | 46 | 34 | 20 | 67 | 1.69 | 15,200 | Random | 21 | X | X |

As is clear from Table 1, in Examples 1 to 14 using a dispersing agent comprising a block copolymer comprising a partial structure represented by general formula (1) in a segment A and comprising a partial structure represented by general formula (2) in a segment B, the alkali developability and dry re-solubility of the coating film were excellent. On the other hand, in Comparative Example 1 using a dispersing agent comprising a block copolymer not comprising a partial structure represented by general formula (1) in a segment A, the alkali developability of the coating film was poor. In addition, in Comparative Examples 2 and 4 using a dispersing agent comprising a block copolymer not comprising a partial structure represented by general formula (1) in a segment A, the alkali developability and dry re-solubility of the coating film were poor. In Comparative Examples 3 and 5 using a dispersing agent comprising a random copolymer comprising a partial structure represented by general formula (1) and a partial structure represented by general formula (2), the alkali developability and dry re-solubility of the coating film were poor. From these results, it is found that in a pigment dispersion composition using as a dispersing agent a block copolymer comprising a partial structure represented by general formula (1) in a segment A and having a partial structure represented by general formula (2) in a segment B, the alkali developability and dry re-solubility of the coating film are excellent.

The invention claimed is:

1. A block copolymer comprising a segment A comprising a partial structure represented by the following general formula (1):

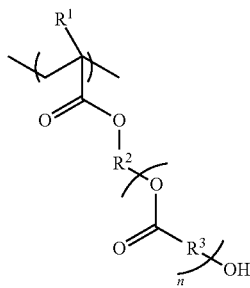

(1)

wherein n is an integer of 1 to 10; $R^1$ is a hydrogen atom or a methyl group; $R^2$ is an alkylene group having 1 to 10 carbon atoms; and $R^3$ is an alkylene group having 1 to 10 carbon atoms, and a segment B comprising a partial structure represented by the following general formula (2):

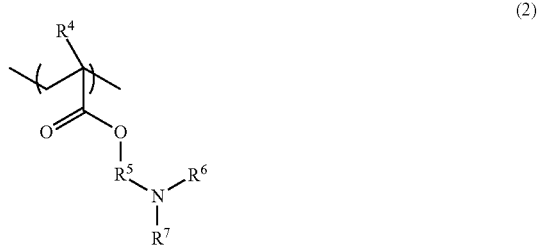

(2)

wherein $R^4$ is a hydrogen atom or a methyl group; $R^5$ is an alkylene group having 1 to 10 carbon atoms; and $R^6$ and $R^7$ are each independently a hydrogen atom or an alkyl group having 1 to 10 carbon atoms, and having an amine value of 20 mg KOH/g to 150 mg KOH/g.

2. The block copolymer according to claim 1, wherein the segment A comprises 10% by mass to 100% by mass of the partial structure represented by the general formula (1).

3. The block copolymer according to claim 1, wherein the segment B comprises 80% by mass to 100% by mass of the partial structure represented by the general formula (2).

4. The block copolymer according to claim 1, wherein a mass ratio of the segment A to the segment B (a mass of the segment A: a mass of the segment B) in the block copolymer is 50:50 to 95:5.

5. The block copolymer according to claim 1, wherein a molecular weight distribution (PDI) of the block copolymer is 1.05 to 2.20.

6. The block copolymer according to claim 1, being a diblock copolymer comprising a block of the segment A and a block of the segment B.

7. A dispersing agent comprising the block copolymer according to claim 1.

8. A pigment dispersion composition comprising the dispersing agent according to claim 7 and a pigment.

9. The pigment dispersion composition according to claim 8 intended for a color filter.

* * * * *